United States Patent [19]

Rosaen

[11] Patent Number: 4,496,459
[45] Date of Patent: Jan. 29, 1985

[54] FLEXIBLE FILTER DEVICE WITH MEANS TO POSITION FILTER BAG

[76] Inventor: Borje O. Rosaen, 4031 Thornoaks, Ann Arbor, Mich. 48104

[21] Appl. No.: 549,246

[22] Filed: Nov. 4, 1983

[51] Int. Cl.³ .................................................. B01D 27/10
[52] U.S. Cl. ....................... 210/310; 210/232; 210/315; 210/484; 210/489; 210/497.01
[58] Field of Search ............... 210/90, 130, 132, 232, 210/238, 484, 485, 486, 497.01, 456, DIG. 14, 315, 483, 489, 499; 55/363, 378, 379, 503; 220/402, 403, 484

[56] References Cited

U.S. PATENT DOCUMENTS

| | | | |
|---|---|---|---|
| 1,421,628 | 4/1922 | Watkins | 220/402 |
| 1,633,818 | 6/1927 | Kogstrom | 210/497.01 |
| 2,384,709 | 9/1945 | Thoren | 220/402 |
| 3,050,189 | 8/1962 | Williams | 210/232 |
| 3,288,290 | 11/1966 | Rosean | 210/DIG. 14 |
| 3,370,708 | 2/1968 | Hultgren et al. | 210/132 |
| 3,762,599 | 10/1973 | Bourgeois | 220/402 |
| 3,771,664 | 11/1973 | Schrink et al. | 210/484 |
| 3,814,261 | 6/1974 | Morgan, Jr. | 210/453 |
| 3,931,015 | 1/1976 | Jenkins | 210/232 |
| 4,157,964 | 6/1979 | Rishel | 210/238 |
| 4,247,394 | 1/1981 | Schmidt, Jr. | 210/767 |
| 4,283,281 | 8/1981 | Cogan | 210/484 |
| 4,427,110 | 1/1984 | Shaw, Jr. | 220/402 |

Primary Examiner—Barry S. Richman
Assistant Examiner—John Donofrio
Attorney, Agent, or Firm—Gifford, Van Ophem, Sheridan, Sprinkle & Nabozny

[57] ABSTRACT

A fluid filtering device comprising a housing having an open top and defining an interior chamber while an inlet and an outlet on the housing are open to the chamber. A filter bag is removably insertable into the chamber through the open top of the housing and to a filtering position in which the filter element is positioned in between the inlet and the outlet. A rim around the outer periphery of the filter bag engages an inwardly extending flange formed on the housing to secure the filter bag to the housing. A cover is movable with respect the housing between an open and a closed position so that in its closed position, the cover closes the open top of the housing. A tubular element is secured to the cover which engages the filter bag and pushes the filter bag away from the open top of the housing and to its filtering position as the cover is moved to its closed position. In the preferred form of the invention, a pressure responsive valve assembly bypasses fluid directly from the inlet and to the outlet when the filter bag is excessively clogged.

10 Claims, 3 Drawing Figures

FLEXIBLE FILTER DEVICE WITH MEANS TO POSITION FILTER BAG

BACKGROUND OF THE INVENTION

I. Field of the Invention

The present invention relates generally to filtering devices and, more particularly, to filtering devices with removable filter media.

II. Description of the Prior Art

There are a number of previously known filtering devices with removable filtering media. These previously known devices typically comprise a housing which defines an interior chamber while an inlet and outlet are secured to the housing and open to the chamber. Conventionally, one end of the housing is open and the filter assembly is removably inserted through the open end of the housing and to a filtering position. In its filtering position, the filter element is positioned in between the housing inlet and outlet and, thereafter, a cover is detachably secured across and closes the open end of the housing.

A number of these previously known devices utilize a filter bag as the filter media. Such filter bags are constructed of flexible, cloth like material and are available in a number of different mesh sizes. These previously known filter bags are typically tubular and cylindrical in construction having one open end and closed at its other end. A rigid rim secured around the open end of the filter bag engages an inwardly extending flange formed in the housing in order to limit the insertion of the filter bag into the housing. These previously known filter devices which utilize filter bags as the filter media, however, suffer from a number of disadvantages.

One disadvantage of such previously known filtering devices is that it is oftentimes difficult to move or seat the filter bag in its filtering position due to the flexible material of which the filter bag is constructed. Furthermore, unless the filter bag is properly seated in its filtering position before operation of the filtering device, the filter bag may not be seated on its filtering position during the operation of the filtering device.

A still further disadvantage of the previously known filtering devices with filter bags is that the surface area of the filter bag and thus its filtering capacity, is necessarily limited by the size of the housing. If additional filtering capacity is necessary, it has been previously necessary to either increase the diameter and/or length of the housing to enable a larger filter bag to be used. Such changes, however, unduly increase the overall cost of the filtering device.

Many previously known filter devices include fluid bypass valves which permit continued fluid flow through the device despite a clogged filter condition. Previously, however, it has been necessary to house the bypass valve in a housing extension which significantly increases the cost of the housing and, thus, the cost of the filter device.

SUMMARY OF THE PRESENT INVENTION

The present invention provides a fluid filtering device which overcomes all of the above mentioned disadvantages of the previously known devices.

In brief, the filter device of the present invention comprises an elongated tubular and cylindrical housing which is closed on one end and open at its other thus defining an interior chamber. An inlet and outlet are formed on the housing and open to the chamber.

A filter bag is removably insertable into the housing chamber through the open top of the housing and to a filtering position in which the filter element is positioned in between the housing inlet and outlet. A rigid rim is secured around the outer periphery of the filter bag and engages an inwardly extending flange formed on the housing when the filter bag is in its filtering position.

A cover is movable with respect to the housing between an open and closed position so that, in its closed position, the cover closes the open end of the housing. In addition, an elongated tubular member is secured to the housing which engages the filter bag as the cover is moved to its closed position and forces the filter bag away from the open end of the housing and thus towards its filtering position.

In the preferred form of the invention, a first elongated strainer is coaxially secured to and spaced radially inwardly from the interior of the housing. In addition, a second strainer is coaxial with and spaced radially inwardly from the first strainer thus forming an annular fluid chamber between the strainers. This annular chamber has an open upper end which faces the open end of the housing.

The filter bag is in the shape of a torroid and has a rigid rim positioned around both its outer and inner peripheries. The filter bag is positioned within the annular chamber formed between the strainers so that the rim around its outer periphery engages an inwardly extending flange at the top of the first strainer while the rim around its inner periphery engages the top of the second strainer. With the filter bag in its filtering position, the filter bag provides an outer filtering surface area along the first strainer and a second filtering surface area along the second strainer thus effectively increasing the filtering capacity of the filter bag without increasing the size of the housing.

In the preferred form of the invention, a normally closed pressure responsive valve is operatively positioned across the interior of the second strainer. The valve opens when the pressure differential across the filter bag exceeds a predetermined amount, indicative of excessive clogging of the filter bag, to permit continued fluid flow through the system despite a clogged filter condition.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
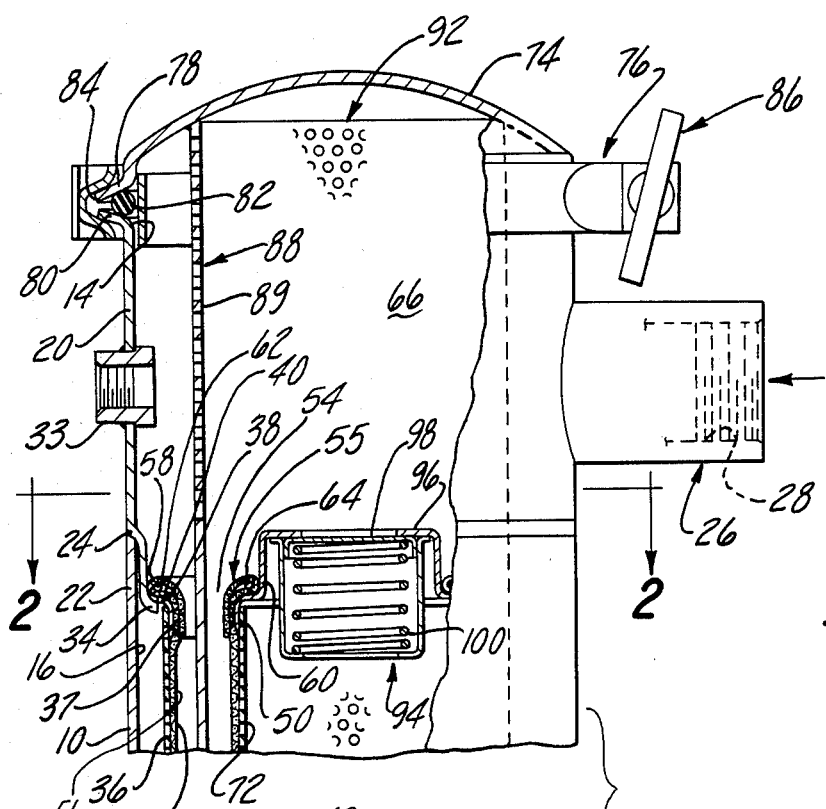
FIG. 1 is a partial longitudinal partial sectional view illustrating a preferred embodiment of the present invention.

With reference first to FIG. 1, a preferred embodiment of the filter device of the present invention is thereshown and comprises an elongated tubular and cylindrical housing 10. The housing 10 is closed at its lower end 12 and open at its upper end 14 and has an interior cylindrical wall 16 which defines an interior chamber 18. The housing 10 is preferably constructed from an upper stamping 20 and a lower stamping 22 which are secured together by a weld 24 although other means for forming the housing 10 can be employed without deviation from the spirit or scope of the invention.

A fluid fitting 26 is secured to and extends outwardly from the housing 10 adjacent its upper end 14 and an inlet 28 is formed through the fitting 26 which is open to the housing chamber 18. Similarly, a second fluid fitting 30 is secured to and extends outwardly from the bottom 12 of the housing 10 and an outlet 32 is formed through the fitting 30 which is also open to the housing chamber 18. The housing 10 may also include a pressure gage fitting 33.

Still referring to FIG. 1, the housing 10 includes an annular and radially inwardly extending flange 34 at a position spaced downwardly from the open end 14 of the housing 10. An elongated tubular and cylindrical strainer 36 is secured to the housing flange 34 by an annular bracket 38 so that the strainer 36 is coaxial with but spaced radially inwardly from the interior wall 16 of the housing 10. In addition, the bracket 38 together with the housing flange 34 forms an annular abutment surface 40 which faces toward the open end 14 of the housing 10.

A second elongated, tubular and cylindrical strainer 42 having a diameter smaller than the first strainer 36 is positioned coaxially within the first strainer 36. The first and second strainers 36 and 42, respectively, are of substantially the same axial length and the lower ends 44 and 46 of the strainers 36 and 42, respectively, are secured together by an annular end cap 48. In doing so, the upper ends 37 and 50 of the strainers 36 and 42 are substantially aligned with each other. In addition, the strainers 36 and 42 form an annular fluid chamber 52 which is open at its top 54 to the open end 14 of the housing 10 but is closed at its bottom by the cap 48. The strainers 36 and 42 are preferably constructed of perforated metal.

Figure 2:
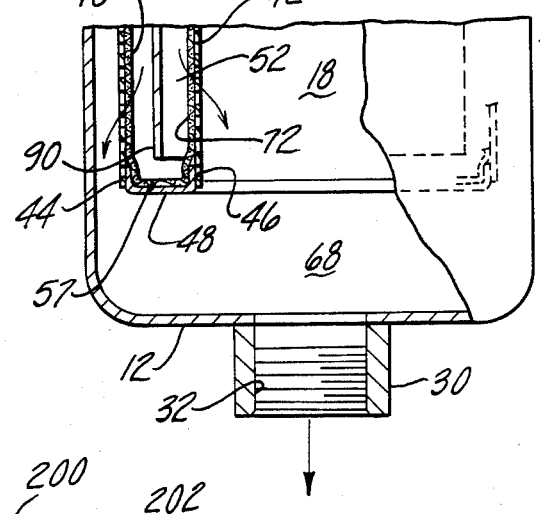
FIG. 2 is a cross sectional view taken substantially along line 2—2 in FIG. 1.
Figure 2:
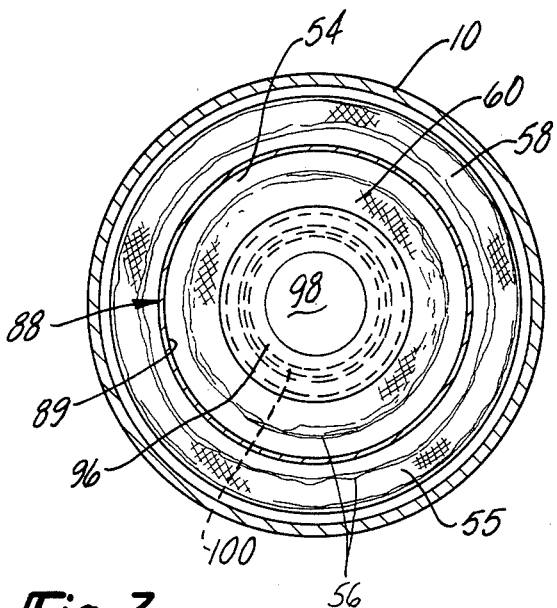

With reference to FIGS. 1 and 2, a filter assembly 55 comprising a filter bag 56 is insertable through the open end 14 of the housing 10 and into the annular chamber 52 formed between the strainers 36 and 42. The filter bag 56 is constructed of a flexible, cloth like material and is generally toroidal in shape thus having an outer periphery 58 and an inner periphery 60. A rigid ring 62 is secured to the filter bag 56 around its outer periphery 58 while a smaller diameter rigid ring 64 is secured to the filter bag 58 around its inner periphery 60.

With the filter bag 56 positioned within the annular chamber 52 as shown in FIG. 1, the filter bag 56 divides the housing chamber 18 into an upper inlet chamber 66 and a lower outlet chamber 68 so that, during normal operation, all of the fluid flow into the inlet 28 passes through the filter bag 56 before entering the outlet chamber 68. In the housing 10, the ring 62 on the outer periphery of the bag 56 abuts against the housing abutment surface 40 while the second ring 64 abuts against the top end of the second strainer 42. Consequently, a first portion 70 of the filter bag 56 extends along and covers one side of the first strainer 56 while a second portion 72 of the filter bag 56 extends along and covers one side of the second strainer 42. The filter bag 56 is dimensioned so that its lower end 57 is positioned closely adjacent the end cap 48 when the bag 56 is in its filtering position.

Referring again to FIG. 1, a cover 74 is detachably secured across the upper open end 14 of the housing 10 by a locking ring 76. As shown in FIG. 1, the cover 74 includes flange 78 formed about its outer periphery which registers with an outwardly flared portion 80 formed at the upper open end 14 of the housing 10. An annular seal 82 is positioned in between the outer cover flange 78 and the housing flared portion 80 in order to fluidly seal the cover 74 to the housing 10.

Although any conventional means can be used to secure the cover 74 to the housing 10 as shown in FIG. 1, the ring 76 extends around the housing 10 and cover 74 and includes a U-shaped locking portion 84 between which the flange 78 and housing flared portion 80 are received. The ring is secured together by a threaded fastener 86 so that, upon tightening of the fastener 86, the locking portion 84 compresses the cover flange 78 and housing flared portion 80 together thus sandwiching the seal member 82 therebetween.

Still referring to FIG. 1, an elongated tubular member 88 is secured to the cover 74. The tubular member 88 is dimensioned so that, with the cover 74 in its closed position, the tubular member 88 extends through the annular chamber 52 between the strainers 36 and 42 and the lower end 90 of the tubular member 88 terminates just short of the end cap 48. At least the upper portion 89 of the tubular member 88 is perforated as shown at 92 so that fluid flow into the inlet 28 flows both into the interior and around the outside of the tubular member 88.

Still referring to FIG. 1, a normally closed pressure responsive bypass valve 94 is secured across the interior of the second strainer 42 and preferably at its upper end. The valve 94 is conventional in construction and comprises a valve seat 96 and a valve member 98 which is urged against the valve seat 96 by a compression spring 100. The valve assembly 94 normally fluidly closes the interior of the second strainer 42 and thus prohibits fluid flow from the inlet chamber 66 and directly into the interior of the second strainer 42. However, when the pressure in the inlet chamber 66 exceeds the pressure in the outlet chamber 68 by a predetermined amount, the valve member 98 opens against the force of the compression spring 100 and permits fluid to flow directly from the inlet chamber 66 and to the outlet chamber 68 via the interior of the second strainer 42.

In operation, the filter bag 56 is inserted through the open upper end 14 of the housing 10 so that the outer ring 62 on the filter bag 56 abuts against the abutment surface 40 while the inner ring 60 abuts against the top of the strainer 42. At this time, the filter bag 56 may also be partially positioned within the annular chamber 52 formed between the strainers 36 and 42.

The housing cover 74 is then moved to its closed position across the open top 14 of the housing 10. In doing so, the tubular member 88 engages the filter bag 56 and moves the cover end 57 of the filter bag 56 toward the lower end 12 of the housing 10 and thus moving the filter bag 56 to its filtering position. The filter bag 56 is then fluidly positioned between the housing inlet 28 and outlet 32.

After the cover 74 is secured to the housing 10 by the locking ring 76, fluid flow into the inlet 28 flows into the annular chamber 52 from the inlet chamber 66. From the chamber 52, fluid flows through both portions 70 and 72 of the filter bag 56, the strainers 36 and 42 and into the outlet chamber 68. From the outlet chamber 68, the fluid flows outwardly through the outlet 32 and forms the effluent from the filtering device.

In the event that the pressure differential between the inlet chamber 66 and outlet chamber 68 exceeds a predetermined amount as determined by the spring 100, the valve member 98 opens against the force of the compression spring 100 and permits fluid flow to flow directly from the inlet chamber 66 and to the outlet chamber 68 through the interior of the second strainer 42. Such an excessive pressure differential would be indicative of an excessively clogged filter bag 56. The filter bag 56 can then be replaced by a clean filter bag 56 whereupon normal operation of the filter device can continue.

Figure 3:
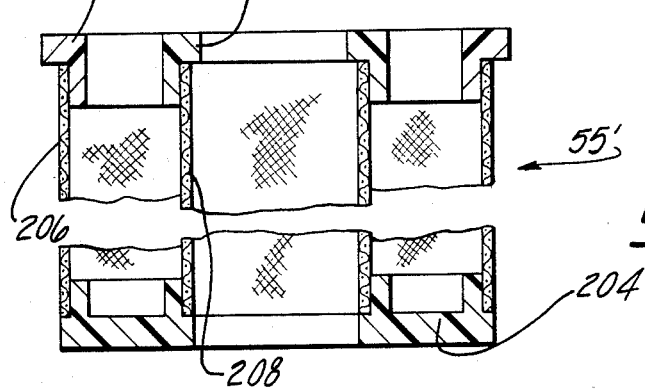
FIG. 3 is a cross sectional view illustrating a modification of the filter bag.

With reference now to FIG. 3, an alternative construction for the filter assembly 55' is thershown and comprises an outer plastic ring 200 and an inner plastic ring 202, both of which are L-shaped in cross section. The rings 200 and 202 are dimensioned to engage the abutment surfaces 40 and the top end of the second strainer 42, respectively. In addition, the filter assembly 55' includes a U-shaped lower plastic annulus 204 dimensioned to fit in between and at the bottom of the strainers 36 and 42.

Still referring to FIG. 3, a first tubular cylindrical filter bag segment 206 is secured between the outer ring 200 and the outside of the annulus 204. Similarly, a second tubular cylindrical filter bag segment 208 is secured between the inner ring 202 and the inner periphery of the annulus. Preferably, the bag segments 206 and 208 are fused or adhesively secured to the rings 200 and 202 and annulus 204.

The filter assembly 55' is inserted between the strainers 36 and 42 in the same fashion as the filter assembly 55 (FIG. 1). In practice, the filter assembly 55' eliminates the seam common to standard filter bags and provides better sealing.

From the foregoing, it can be seen that the present invention provides an improved fluid filtering device. An important advantage of the present invention is the provision of the tubular member 88 which automatically forces the flexible filter bag 56 to its filtering position as the cover 74 is secured to the housing 10. Consequently, the previously known difficulty in positioning the filter bag 56 in its filtering position is entirely eliminated.

A still further advantage of the present invention is the provision of the dual strainers 36 and 42 which, together with the filter bag 56, effectively increases the overall surface area and thus the filtering capacity of the filter device without enlarging the housing. The dual strainers 36 and 42 also enable simple positioning for the bypass valve assembly 94 in the center of the housing and without the previously known necessity of mounting the bypass valve assembly in a separate housing extension.

Having described my invention, however, many modifications thereto will become apparent to those skilled in the art to which it pertains without deviation from the spirit of the invention as defined by the scope of the appended claims.

I claim:

1. A fluid filtering device comprising:
   a tubular housing having an interior wall, an open top and defining an interior chamber,
   said housing having an inlet and an outlet open to said chamber,
   a filter assembly removably insertable into said chamber through said open top and to a filtering position in which said filter assembly is positioned between said inlet and said outlet, said filter assembly comprising a flexible filter bag having an outer periphery and a rim secured around said outer periphery, said rim engaging a portion of said housing when said filter assembly is in said filtering position,
   a cover movable with respect to said housing between an open and a closed position in which said cover closes the open end of said housing,
   means for detachably securing said cover to said housing when said cover is in said closed position,
   means carried by said cover for engaging and pushing said filter bag away from said open top of said housing as said cover is moved from said open and to said closed position.

2. The invention as defined in claim 1 wherein said housing is elongated and wherein said housing portion comprises an inwardly extending flange formed around said interior wall of said housing at a position spaced downwardly from said open end of said housing.

3. The invention as defined in claim 1 wherein said filtering device comprises:
   a first elongated and tubular strainer and means for securing said strainer to said housing so that said strainer is spaced inwardly from said interior wall of said housing, and
   wherein said filter bag extends across and covers an interior of said first strainer when said filter assembly is in said filtering position.

4. The invention as defined in claim 3 and comprising a second elongated and tubular strainer, said second strainer coaxial with and spaced inwardly from said first strainer thus forming an annular chamber between said strainers, said annular chamber having one end open to said open end of said housing, means for securing the other end of said first strainer to said second strainer, and wherein said filter bag is positioned in said annular chamber.

5. The invention as defined in claim 4 and comprising a normally closed, pressure responsive valve assembly secured across the interior of said second strainer.

6. The invention as defined in claim 4 wherein said filter is toroidal in shape thus having an inner periphery, said device comprising a second rim secured around the inner periphery of said filter bag, said second rim engaging an end of said second strainer closest to said housing open end when said filter assembly is in said filtering position.

7. The invention as defined in claim 6 wherein said engaging and pushing means means comprises an elongated and tubular member secured at one end to said cover, said tubular member extending between said strainers when said cover is in said closed position.

8. The invention as defined in claim 7 wherein the other end of said tubular member is positioned closely adjacent the ends of said strainers most spaced from said housing open end when said cover is in said closed position.

9. The invention as defined in claim 6 wherein said filter assembly comprises an annulus, a first tubular and cylindrical filter bag segment extending between said first rim and an outer periphery of said annulus, and a second tubular and cylindrical filter bag segment extending between said second rim and an inner periphery of said annulus.

10. The invention as defined in claim 9 wherein said rims and said annulus are constructed of plastic.

* * * * *

UNITED STATES PATENT AND TRADEMARK OFFICE
CERTIFICATE OF CORRECTION

PATENT NO. : 4,496,459
DATED : January 29, 1985
INVENTOR(S) : Borje O. Rosaen

It is certified that error appears in the above—identified patent and that said Letters Patent is hereby corrected as shown below:

Column 1, line 43 delete "on" insert --in--.

Column 2, line 15, delete "housing" insert --cover--.

Column 2, line 27 delete "torroid" insert --toraid--.

Column 3, line 10 delete "and" insert --,--.

Column 3, line 65 delete "56" insert --36--.

Column 4, line 68 after "56" insert --through--.

Column 5, line 52 after "housing" insert --10--.

Column 5, line 54 after "housing" insert --10--.

Column 5, line 56 after "assembly" insert --94--.

Signed and Sealed this

Twentieth Day of May 1986

[SEAL]

Attest:

DONALD J. QUIGG

Attesting Officer

Commissioner of Patents and Trademarks